(12) United States Patent
Huang et al.

(10) Patent No.: US 11,643,367 B2
(45) Date of Patent: May 9, 2023

(54) COMPOSITE MATERIAL FABRICATION METHOD

(71) Applicant: National Chung-Shan Institute of Science and Technology, Taoyuan (TW)

(72) Inventors: Mau-Yi Huang, New Taipei (TW); Hao-Chung Hsiao, New Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 859 days.

(21) Appl. No.: 16/595,488

(22) Filed: Oct. 8, 2019

(65) Prior Publication Data

US 2021/0101843 A1    Apr. 8, 2021

(51) Int. Cl.
| | | |
|---|---|---|
| *C04B 35/83* | (2006.01) | |
| *C04B 35/634* | (2006.01) | |
| *C04B 35/628* | (2006.01) | |
| *F02K 9/97* | (2006.01) | |

(52) U.S. Cl.
CPC ........ *C04B 35/83* (2013.01); *C04B 35/62873* (2013.01); *C04B 35/62884* (2013.01); *C04B 35/62886* (2013.01); *C04B 35/62894* (2013.01); *C04B 35/634* (2013.01); *C04B 2235/422* (2013.01); *C04B 2235/5232* (2013.01); *C04B 2235/5248* (2013.01); *C04B 2235/5256* (2013.01); *F02K 9/97* (2013.01)

(58) Field of Classification Search
CPC .......... F05D 2230/31; F05D 2300/603; F05D 2250/20; F05D 2300/6034; C04B 2235/422; C04B 2235/5232; C04B 2235/5248; C04B 2235/5256; C04B 2235/6026; C04B 2235/5268; C04B 35/62873; C04B 35/634; C04B 35/80; C04B 35/83; Y10T 156/1056; Y10T 156/1057; Y10T 428/249923; D04H 3/04; D04H 3/12; D04H 3/15; D03D 25/005; B29C 70/24; B29C 70/245; F16B 5/0692; B32B 5/26; B32B 5/28; B32B 5/12; B32B 2260/023; B32B 2260/046; B32B 21/10; B32B 29/02
USPC ...... 428/137, 368, 223, 113; 264/29.1, 29.2; 156/252, 296, 155, 181, 253, 301.1, 92
See application file for complete search history.

(56) References Cited

U.S. PATENT DOCUMENTS 4,257,835 A * 3/1981 Bompard .............. F16D 69/023
428/218

* cited by examiner

*Primary Examiner* — Camie S Thompson
(74) *Attorney, Agent, or Firm* — Winston Hsu

(57) ABSTRACT

A composite material fabrication method includes stacking a plurality of fiber layers and a first binder and curing the first binder to form a three-dimensional structure with a plurality of mesh openings, and filling the plurality of mesh openings with a plurality of fiber filaments of a fiber array and a second binder and curing the second binder. A plurality of first mesh openings of the plurality of mesh openings are connected in a first direction.

7 Claims, 10 Drawing Sheets

COMPOSITE MATERIAL FABRICATION METHOD

BACKGROUND OF THE INVENTION

1. Field of the Invention

The present invention relates to a composite material fabrication method for fabricating a composite material with multi-dimensional reinforcements, and more particularly, to a composite material fabrication method for fabricating a composite material with multi-dimensional reinforcements that satisfies strength requirements and reduces manufacture cost and complexity.

2. Description of the Prior Art

It is by expelling a high temperature exhaust from a rocket nozzle that a rocket motor can create thrust. The rocket nozzle is designed for the high temperature exhaust to expand and accelerate, which however exerts pressure against the walls of the rocket nozzle. As a result, there is a need for an improvement in rocket nozzle that offers thermal performance, promising structural strength, ease of manufacture, less fabrication cost and wastes.

SUMMARY OF THE INVENTION

Therefore, the present invention primarily provides a composite material fabrication method to fabricate a composite material with multi-dimensional reinforcements, which satisfies strength requirements (especially in a thickness direction) and reduces manufacture cost and complexity.

An embodiment of the present application discloses a composite material fabrication method includes stacking a plurality of fiber layers and a first binder and curing the first binder to form a three-dimensional structure with a plurality of mesh openings, and filling the plurality of mesh openings with a plurality of fiber filaments of a fiber array and a second binder and curing the second binder. A plurality of first mesh openings of the plurality of mesh openings are connected in a first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
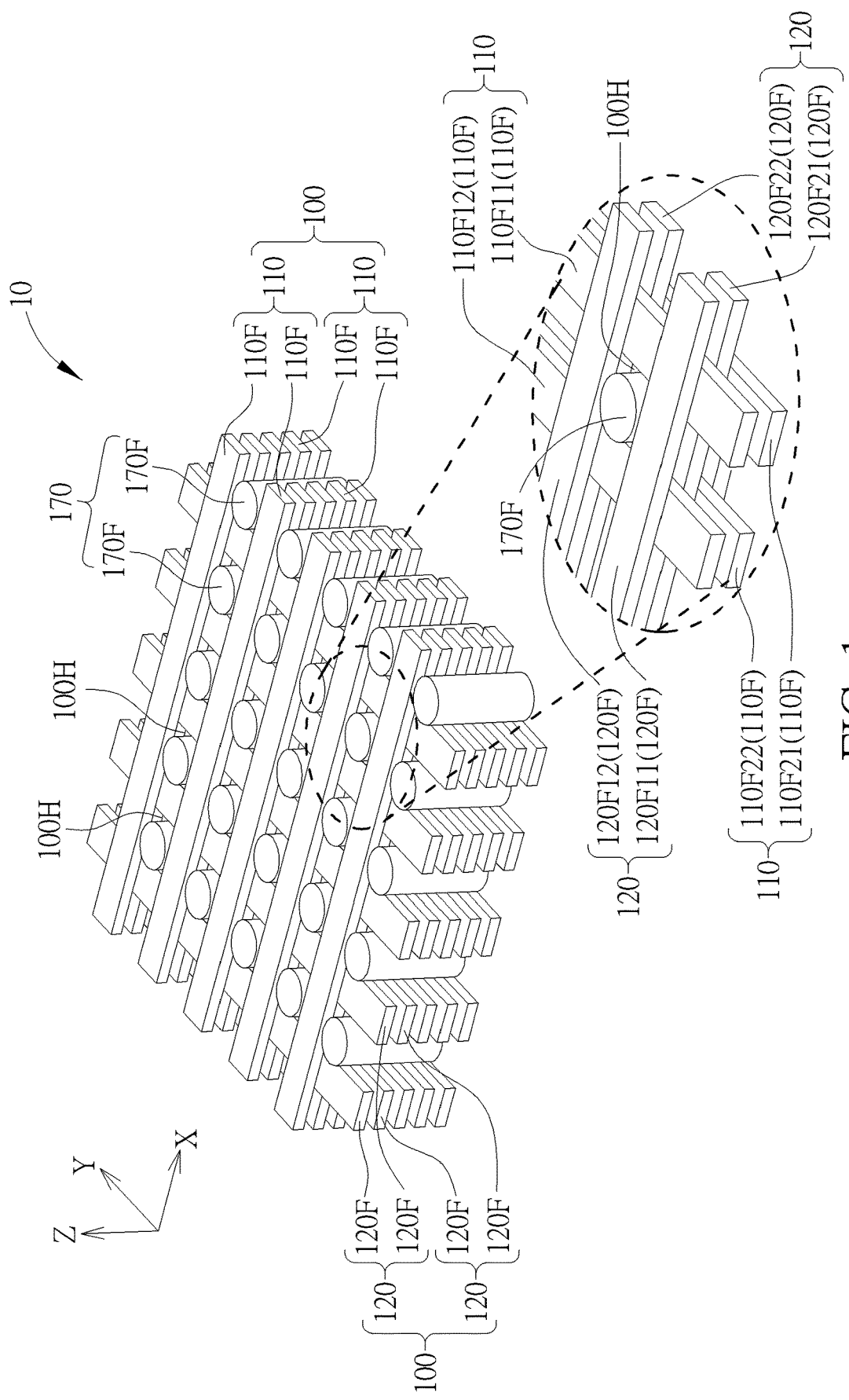
FIG. 1 is a view diagram of a composite material according to an embodiment of the present invention.

Please refer to FIG. 1. FIG. 1 is a (local) view diagram of a composite material 10 according to an embodiment of the present invention. An x-y-z coordinate system is shown in FIG. 1 (and subsequent figures) to express the spatial relation. The composite material 10, which is a composite material with three-dimensional (3D) fiber reinforcements, includes fiber layers 100, a fiber array 170, a first binder (not shown) and a second binder (not shown). The fiber layers 100 may be categorized into first fiber layers 110 and second fiber layers 120. Each of the first fiber layers 110 includes fiber filaments 110F. Each of the second fiber layers 120 includes fiber filaments 120F. The fiber array 170 includes fiber filaments 170F. The exact number of the first fiber layers 110 (or the second fiber layers 120, the fiber filaments 110F, 120F, 170F) may vary according to different design requirements.

To put it briefly, the first fiber layers 110, 120 and/or the fiber array 170 are respectively formed by means of 3D printing technology to facilitate process automation. The ratio of the volume of the fiber filaments (such as the fiber filaments 110, 120 and/or 170F) to the volume of the composite material 10 is high. Moreover, the fiber filaments (such as the fiber filaments 110, 120 and/or 170F) may be continuous fibers to attain high performance. In this manner, the composite material 10 demonstrates a high degree of structural integrity to withstand severe stresses or strains. There is a reduced need for post machining processes (or surface treatment) to form the composite material 10 (serving as a raw material) into an end product. The fabrication of the end product is highly efficient in its use of materials, thereby producing few wastes.

Figure 2:
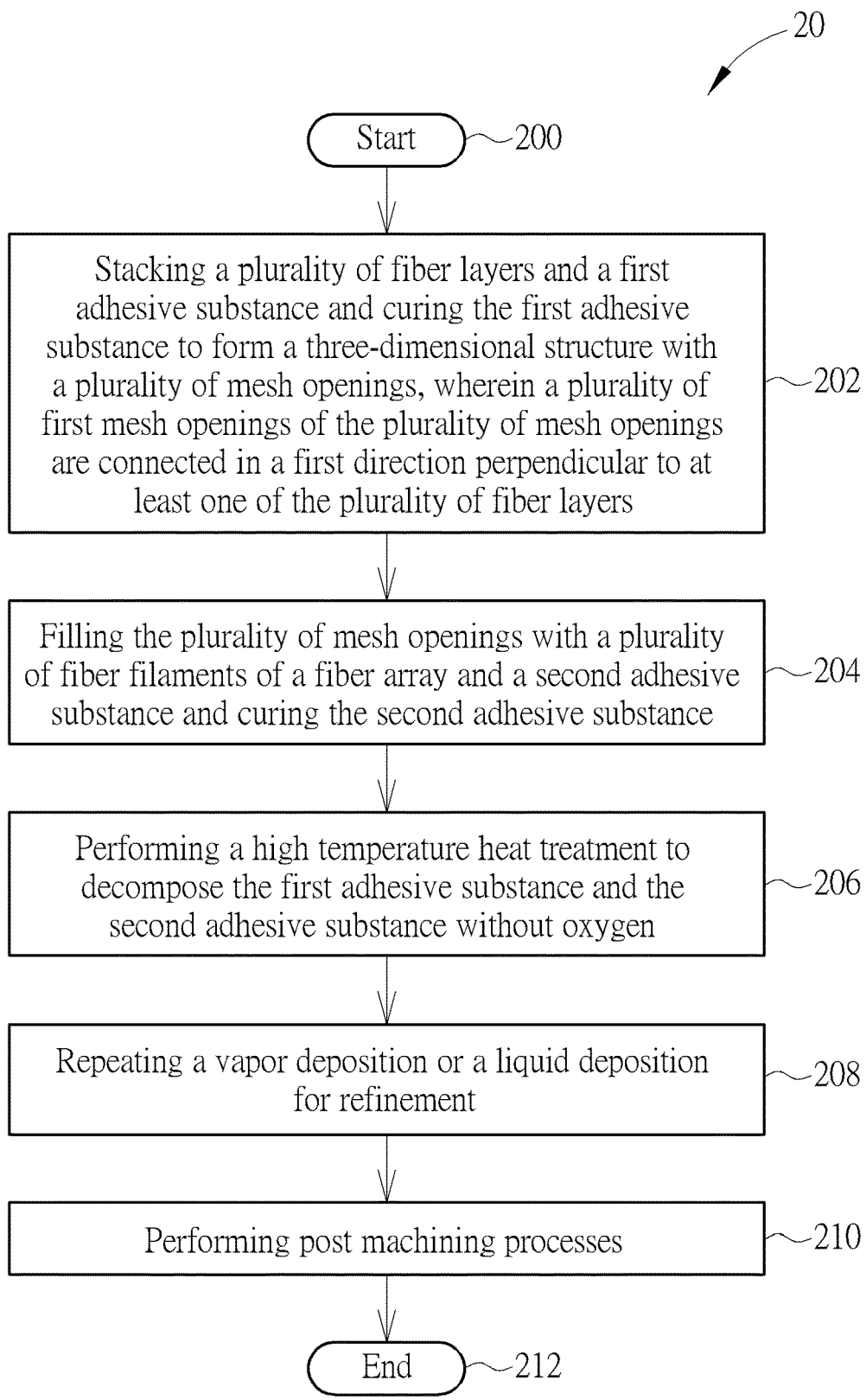
FIG. 2 is a flowchart of a composite material fabrication method according to an example of the present invention.

FIG. 2 is a flowchart of a composite material fabrication method 20 according to an example of the present invention. The composite material fabrication method 20 includes the following steps:

Step 200: Start.

Step 202: Stacking a plurality of fiber layers and a first binder and curing the first binder to form a three-dimensional structure with a plurality of mesh openings, wherein a plurality of first mesh openings of the plurality of mesh openings are connected in a first direction.

Step 204: Filling the plurality of mesh openings with a plurality of fiber filaments of a fiber array and a second binder and curing the second binder.

Step 206: Performing a high temperature heat treatment in a non-oxygen environment to decompose the first binder and the second binder.

Step 208: Repeating a vapor deposition or a liquid deposition process for densification.

Step 210: Performing post machining processes.

Step 212: End.

A lamination process to configure the fiber layers 100 and the first binder (not shown) is performed in Step 202. As shown in FIG. 1, the fiber layers 100 is built up from the first fiber layers 110 and the second fiber layers 120. In some embodiments, the first fiber layers 110 and the second fiber layers 120 are alternately stacked to form a 3D structure. In other words, the composite material 10 is basically made by means of a layer stacking method. Moreover, each of the fiber layers 100 is disposed in a plane; each of the fiber layers 100 may be of a sheet-like shape and substantially flat. More specifically, in the lamination process, the first fiber layers 110 and the second fiber layers 120 of the fiber layers 100 lie in the xy-plane respectively. The fiber filaments 110F (or the first fiber filaments) of the first fiber layers 110 (are aligned and thus) extend in a direction X (or the second direction). The fiber filaments 120F (or the second fiber filaments) of the second fiber layers 120 (are aligned and thus) extend in a direction Y (or the third direction). The orientation of the fiber filaments 110F may be perpendicular to the orientation of the fiber filaments 120F; however, the present invention is not limited thereto, and an included angle between one fiber filament 110F and one fiber filament 120F may alter according to different design requirements.

Two adjacent fiber filaments 110F (or two adjacent fiber filaments 120F) are staggered and spaced a distance apart. In some embodiments, the distances, each of which is between two adjacent fiber filaments 110F, 120F, are constant and thus equal to each other. In some embodiments, the distances are arbitrary. The fiber filaments 110F, 120F crisscross each other. As viewed along the z-axis, mesh openings 100H are formed and equally spaced. In some embodiments, the mesh openings 100H are defined by the (adjacent) fiber filaments 110F, 120F. For example, fiber filaments 110F11, 110F12 of the fiber filaments 110F are intersected with fiber filaments 120F11, 120F12 of the fiber filaments 120F to form a (upper) mesh opening 100H. Similarly, fiber filaments 110F21, 110F22 of the fiber filaments 110F are intersected with fiber filaments 120F21, 120F22 of the fiber filaments 120F to forma (lower) mesh opening 100H. In some embodiments, some of the mesh openings 100H are connected. For example, the two mesh openings 100H (i.e., the upper mesh opening 100H and the lower mesh opening 100H) are connected in a direction Z (or a first direction), which is perpendicular to any of the first fiber layers 110 and the second fiber layers 120. The direction Z may therefore be regarded as a thickness direction. In some embodiments, all of the mesh openings 100H aligned in a straight line are connected.

In FIG. 1, each of the fiber filaments 110F, 120F is shape like a cuboid, but not limited thereto. In some embodiments, each of the fiber filaments 110F, 120F may be made of materials such as carbon fiber, but not limited thereto. In some embodiments, each of the fiber filaments 110F, 120F may be made of materials such as fiberglass, fiber-reinforced plastic (FRP), Kevlar fiber, Quartz fiber, silicon fiber, metallic material and the combination thereof, but not limited thereto.

In some embodiments, the first binder, which may be adhesive such as resin, is utilized to combine the first fiber layers 110 and the second fiber layers 120. In some embodiments, the first binder may be made of thermoplastic materials such as Polylactic Acid (PLA) (also referred to as Polylactide), Poly (ethylene terephthalateco-1,4-cylclohexylenedimethylene terephthalate) (PETG), Nylon, Polycarbonates (PC) and Polypropylene (PP), but not limited thereto. In some embodiments, the first binder may be made of materials such as phenolic resins and pitch, but not limited thereto. For a successful assembly, the first binder may harden to provide a joint which is capable of bearing the forces. There are a number of ways to get the first binder in a liquid state to become a solid. In some embodiments, the first binder dries. In some embodiments, the first binder is cooled from a higher temperature. In some embodiments, certain (chemical) reaction takes place for the first binder to be cured. There are light cure, moisture cure and heat cure to ensure (precise) fixing.

In some embodiments, the first binder is cured during the lamination process of the fiber layers 100. For example, when alternately laying the first fiber layers 110 and the second fiber layers 120, the first binder is subjected to thermal cure and solidifies. In other words, the lamination process and the thermal curing are performed at a time. In some embodiments, the first binder is cured after the lamination process. For example, the first fiber layers 110 and the second fiber layers 120 are disposed alternately, and then the temperature rises to cause cure.

In some embodiments, the first binder is interposed between the first fiber layers 110 and the second fiber layers 120. In some embodiments, the first binder encloses or covers the fiber filaments 110F of the first fiber layers 110 (or the fiber filaments 120F of the second fiber layers 120). In some embodiments, the fiber filaments 110F, 120F may be discrete fibers. That is to say, one of the fiber filaments 110F, 120F may include sections, which constitute a fiber filament having an effective length similar to that of the other fiber filament 110F or 120F. In such a situation, the first binder may attach the sections. In some embodiments, the fiber filaments 110F, 120F may be continuous fibers to attain high performance; that is to say, the fiber filaments 110F, 120F are long and extended without broken to form an unbroken whole.

To reinforce the fiber layers 100 (especially in the thickness direction), a filling process is performed in Step 204. As shown in FIG. 1, the fiber filaments 170F of the fiber array 170 (are aligned and thus) extend in the direction Z. Clearly, the orientation of the fiber filaments 170F is perpendicular to the orientation of the fiber filaments 110F or 120F, which lie in the xy-plane. The fiber filaments 170F of the fiber array 170 are arranged in an array. Moreover, the fiber filaments 170F of the fiber array 170 and a second binder fill the mesh openings 100H. For example, one of the fiber filaments 170F11 passes through the two aforementioned mesh openings 100H (i.e., the upper mesh opening 100H and the lower mesh opening 100H) formed by the fiber filaments 110F11, 110F12, 120F11, 120F12, 110F21, 110F22, 120F21, 120F22. In some embodiments, the fiber filaments 170F11 may be embedded in the two aforementioned mesh openings 100H formed by the fiber filaments 110F11 to 110F22 and 120F11 to 120F12. In some embodiments, a center of one mesh opening 100H may be aligned to a center of one fiber filament 170F.

In FIG. 1, each of the fiber filaments 170F is shape like a cylinder, but not limited thereto. Each of the fiber filaments 170F may have a shape of a cuboid to fit the mesh openings 100H. In some embodiments, each of the fiber filaments 170F may be made of materials such as carbon fiber, but not limited thereto. In some embodiments, each of the fiber filaments 170F may be made of materials such as fiberglass, fiber-reinforced plastic (FRP), Kevlar fiber, Quartz fiber, silicon fiber, metallic material and the combination thereof, but not limited thereto.

In some embodiments, the second binder, which may be adhesive such as resin, is utilized to combine the fiber layers 100 and the fiber array 170. In some embodiments, the second binder may be made of thermoplastic materials such as Polylactic Acid (PLA) (also referred to as Polylactide), Poly (ethylene terephthalateco-1,4-cylclohexylenedimethylene terephthalate) (PETG), Nylon, Polycarbonates (PC) and Polypropylene (PP), but not limited thereto. In some embodiments, the second binder may be made of materials such as phenolic resins and pitch, but not limited thereto. For a successful assembly, the second binder may harden to provide a joint which is capable of bearing the forces. The second binder may dry, be cooled or cured to ensure (precise) fixing. In some embodiments, the second binder is cured during the filling process. For example, when filling the mesh openings 100H with the fiber filaments 170F of the fiber array 170 and the second binder, the second binder is subjected to thermal cure and solidifies. In some embodiments, the second binder is cured after the filling process. For example, the mesh openings 100H are filled with the fiber filaments 170F of the fiber array 170 and the second binder, and then the temperature rises to cause cure. In some embodiments, the second binder is cured before the filling process. For example, the fiber filaments 170F of the fiber array 170 and the second binder to be inserted into the mesh openings 100H are composite material sticks cured in advance. That is, the fiber filaments 170F of the fiber array 170 and the second binder are cured in advance to form composite material sticks. Then, the composite material sticks are placed into the mesh openings 100H.

In some embodiments, the second binder is interposed between the fiber layers 100 and the fiber array 170. In some embodiments, the second binder encloses or covers the fiber filaments 170F of the fiber array 170. In some embodiments, if the second binder is made of thermoplastic materials, the second binder encloses or covers the fiber filaments 170F of the fiber array 170 in advance. In some embodiments, if the second binder is made of thermosetting materials, the second binder may be brought into a semi-cured state before the second binder is disposed on the outside of the fiber filaments 170F of the fiber array 170. In some embodiments, if the second binder is made of metallic materials, the second binder is deposited on the outside of the fiber filaments 170F of the fiber array 170 in advance. In some embodiments, the fiber filaments 170F may be discrete fibers. That is to say, one of the fiber filaments 170F may include sections, which constitute a fiber filament having an effective length similar to that of the other fiber filament 170F. In such a situation, the first binder may attach the sections. In some embodiments, the fiber filaments 170F may be continuous fibers to attain high performance. The continuous fiber filaments 170F interlock with the fiber filaments 110F, 120F, thereby resulting in superior strength (especially in a thickness direction) and assuring high reliability.

The next step is Step 206, which is optional. In Step 206, a high temperature heat treatment is executed in a non-oxygen environment to decompose the first binder and the second binder. After the high temperature heat treatment is performed for decomposition, a preform of the composite material 10 with three-dimensional fiber reinforcements is formed. The preform of the composite material 10 is then densified by executing a deposition method such as a vapor deposition or a liquid deposition repeatedly in Step 208 to form the reinforced or strengthened composite material 10. A vapor deposition or a liquid deposition for densification may be repeated again and again in Step 208. Step 208 to perform or repeat a vapor deposition or a liquid deposition is also optional.

In Step 210, a post machining process may be performed to shape the reinforced composite material 10 differently from Step 208. With trimming and finish machining, the reinforced composite material 10 is reshaped into an end product. Step 210 may be optional as additive manufacturing (AM) such 3D printing technology is able to construct the composite material 10 layer by layer and create complex shapes at the same time.

Figure 3A:
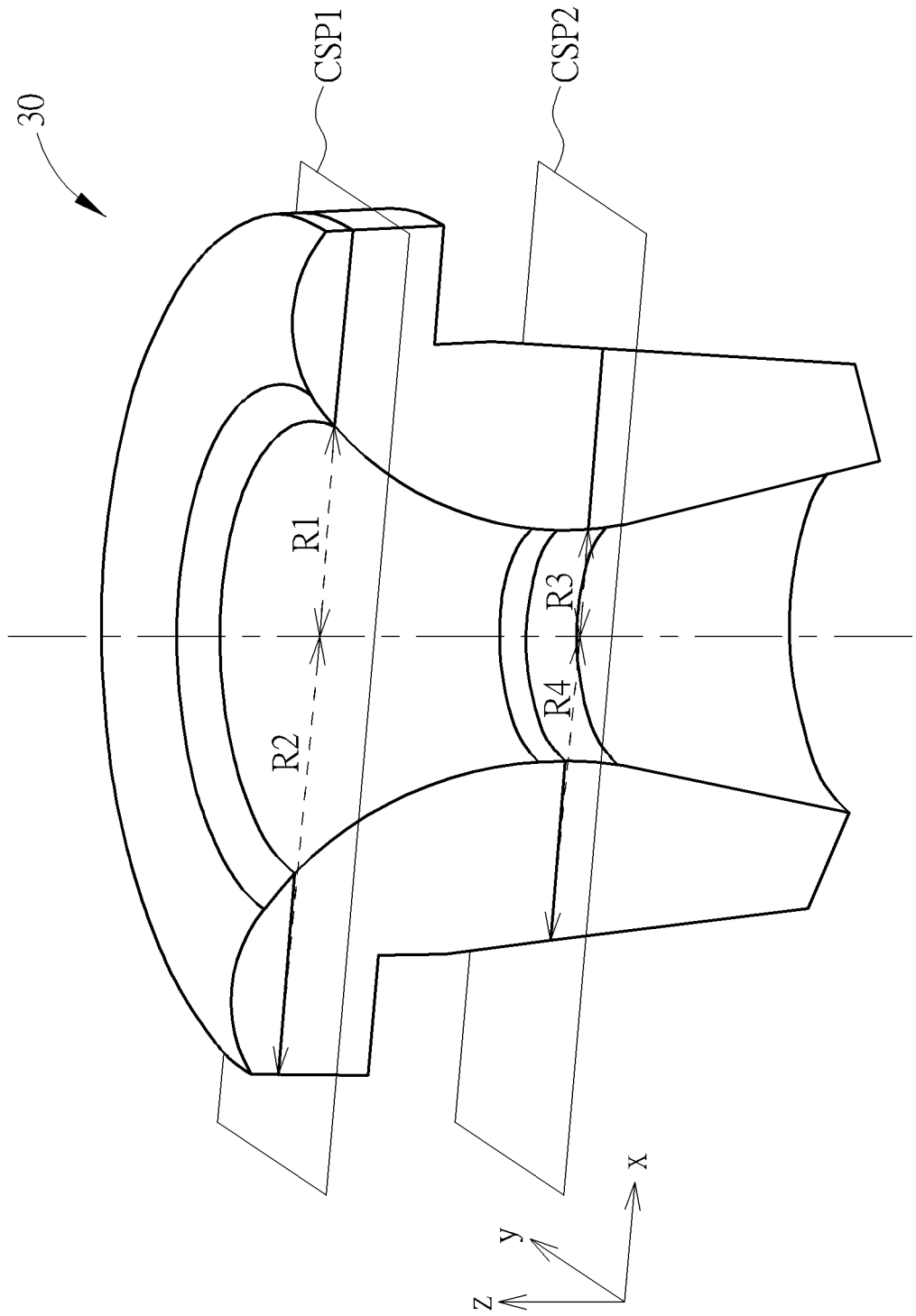
FIG. 3A is a cross-section view diagram of an end product according to an embodiment of the present invention.
Figure 3B:
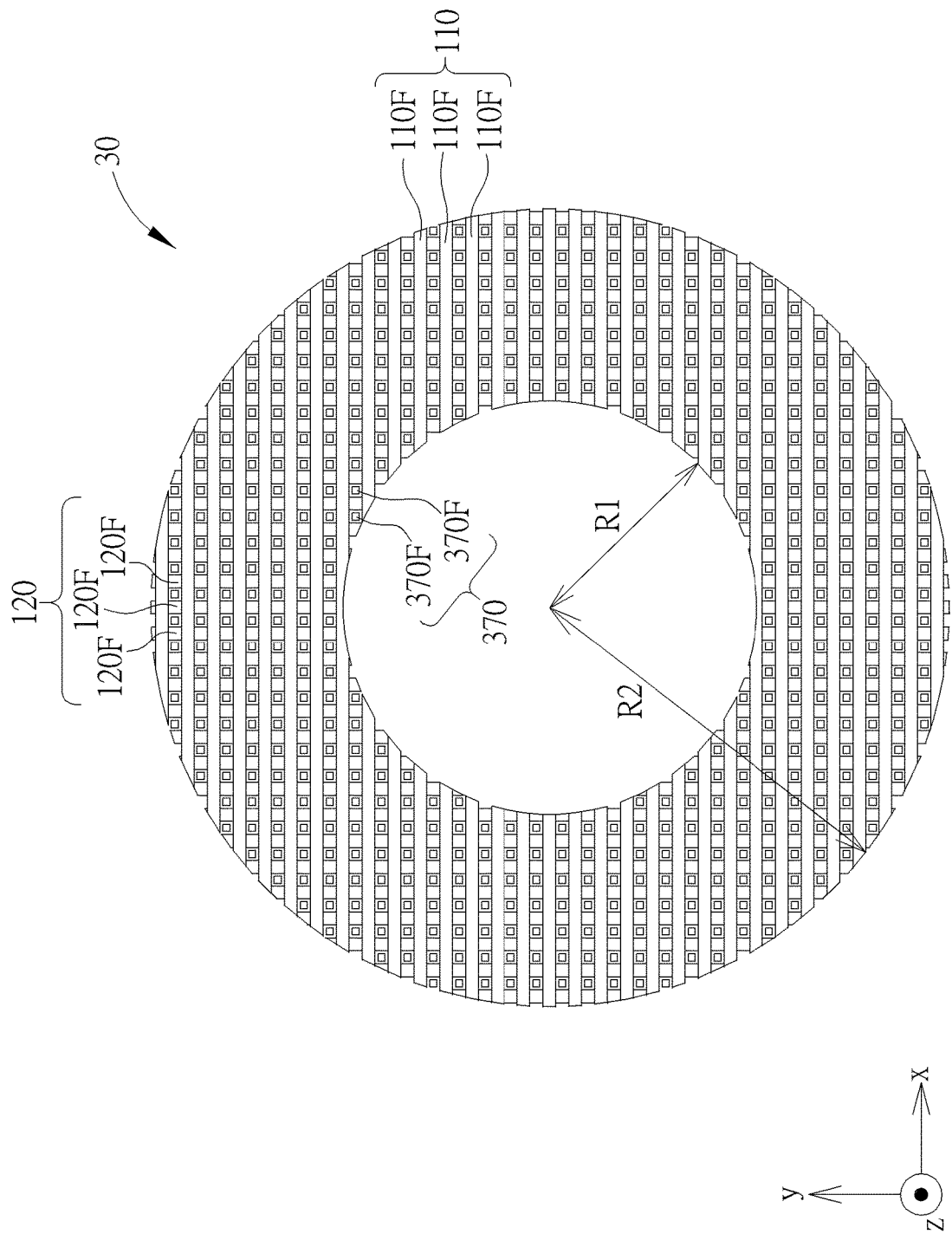
FIG. 3B is a cross-section view diagram of the end product corresponding to a cross-sectional plane CSP1 in FIG. 3A.
Figure 3C:
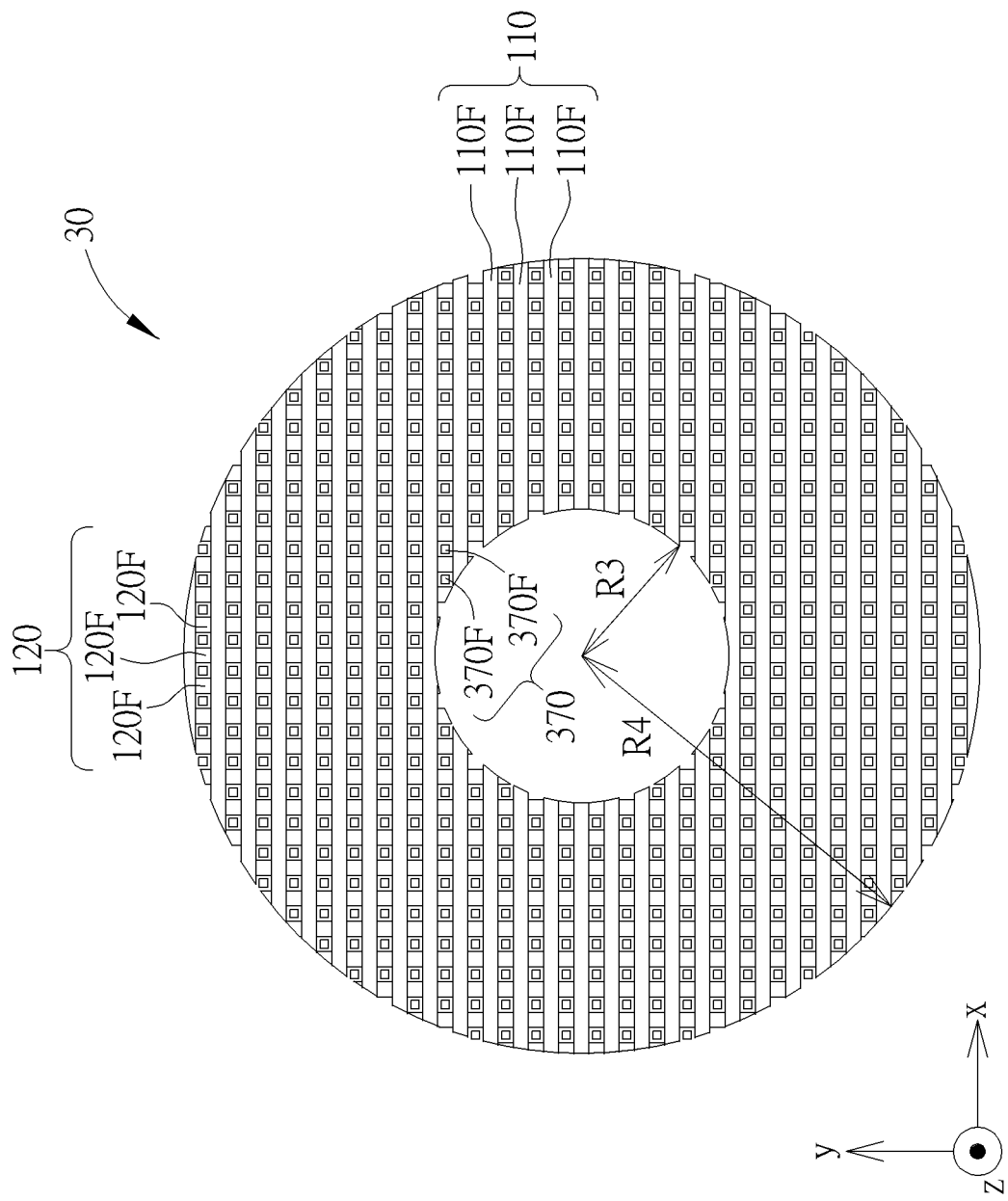
FIG. 3c is a cross-section view diagram of the end product corresponding to a cross-sectional plane CSP2 in FIG. 3A.

More specifically, please refer to FIG. 3A to FIG. 3C. FIG. 3A is a cross-section view diagram of an end product 30 according to an embodiment of the present invention. FIG. 3B is a cross-section view diagram of the end product 30 corresponding to a cross-sectional plane CSP1 in FIG. 3A. FIG. 3c is a cross-section view diagram of the end product corresponding to a cross-sectional plane CSP2 in FIG. 3A. In some embodiments, the end product 30 may be shaped directly to the desired contours on the inside and outside without further machiningprocesses. In some embodiments, the end product 30 is made from a (raw) composite material like the composite material 10 in FIG. 1, and the (raw) composite material like the composite material 10 is reshaped to form the end product 30 with curved sidewalls, for example, by means of cutting machines. Therefore, the same numerals and notations denote the same components in the following description, and the similar parts are not detailed redundantly. The composite material for the end product 30, however, slightly differs from the composite material 10 shown in FIG. 1. Distinct from the composite material 10 shown in FIG. 1, each fiber filament 370F of a fiber array 370 of the end product 30 has a shape of a cuboid while each of the fiber filaments 110F, 120F is shaped like a cuboid as well. The composite material utilized for the end product 30 may be a heat resistant material which is capable of resisting high temperatures and satisfies thermal requirements. In this scenario, the end product 30 may be a rocket nozzle, which is fabricated without huge undesired waste. Although described in terms of a rocket nozzle, the composite material of the present invention may be used for many other applications.

Figure 4:
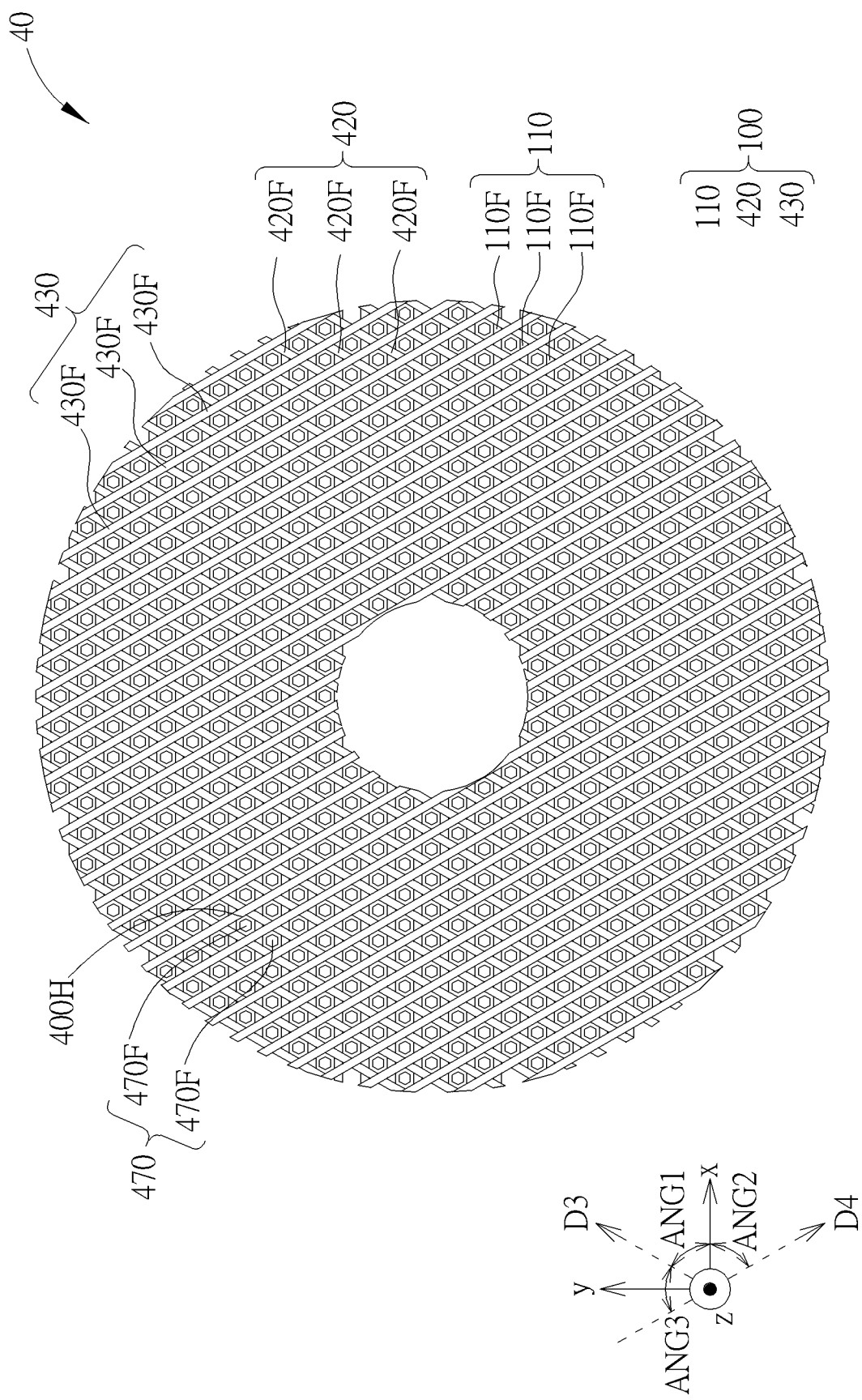
FIG. 4 is a cross-section view diagram of an end product according to an embodiment of the present invention.

The structure of the composite material may be modified according to different design requirements. Please refer to FIG. 4. FIG. 4 is a cross-section view diagram of an end product 40 according to an embodiment of the present invention. The end product 40 is made from composite material like the composite material 10 in FIG. 1, and the structure of the end product 40 is quite similar to that of the end product 30. Therefore, the same numerals and notations denote the same components in the following description, and the similar parts are not detailed redundantly. Distinct from the composite material 10 shown in FIG. 1, the fiber layers 100 may be categorized into first fiber layers 110, second fiber layers 420 and third fiber layers 430. In Step 202, or the lamination process, the fiber layers 100 is built up by alternately stacking the first fiber layers 110, the second fiber layers 420 and the third fiber layers 430.

The fiber filaments 110F of the first fiber layers 110 (are aligned and thus) extend in the direction X. Fiber filaments 420F of (one of) the second fiber layers 420 (are aligned and thus) extend in a third direction D3, which is 60 degrees above the direction X. Fiber filaments 430F of (one of) the third fiber layers 430 (are aligned and thus) extend in a fourth direction D4, which is 60 degrees below the direction X. As set forth above, an included angle ANG1 between an orientation of one fiber filament 110F (or the direction X) and an orientation of one fiber filament 420F (or the third direction D3) is 60 degrees. An orientation of one fiber filament 110F (or the direction X) is at an included angle ANG2 with respect to an orientation of one fiber filament 430F (or the fourth direction D4), and the included angle ANG2 is about 60 degrees. An included angle ANG3 (with respect to an orientation of one fiber filament 420F) of an orientation of one fiber filament 430F is also 60 degrees. In this manner, the composite material for the end product 40 has an in-plane quasi-isotropic property.

In the lamination process, the first fiber layers 110, the second fiber layers 420 and the third fiber layers 430 of the fiber layers 100 lie in the xy-plane respectively. As viewed along the z-axis, two adjacent fiber filaments 110F are intersected with two adjacent fiber filaments 420F and two adjacent fiber filaments 430F to form a mesh opening 400H. In other words, the mesh openings 400H are defined by the (adjacent) fiber filaments 110F, 420F, 430F. The mesh openings 400H are equally spaced. In the filling process, fiber filaments 470F, which extend in the direction Z and are arranged in an array, of a fiber array 470 of the end product 40 fill the mesh openings 100H together with the second binder to reinforce the fiber layers 100. In FIG. 4, each of the fiber filaments 470F of the fiber array 470 is shape like a hexagonal prism, and a cross-section of each fiber filament 470F may be a hexagon to increase the amount of fiber. Consequently, the ratio of the volume of the fiber filaments (such as the fiber filaments 110, 420, 430 and/or 470F) to the volume of the composite material of the end product 40 is high.

Figure 5:
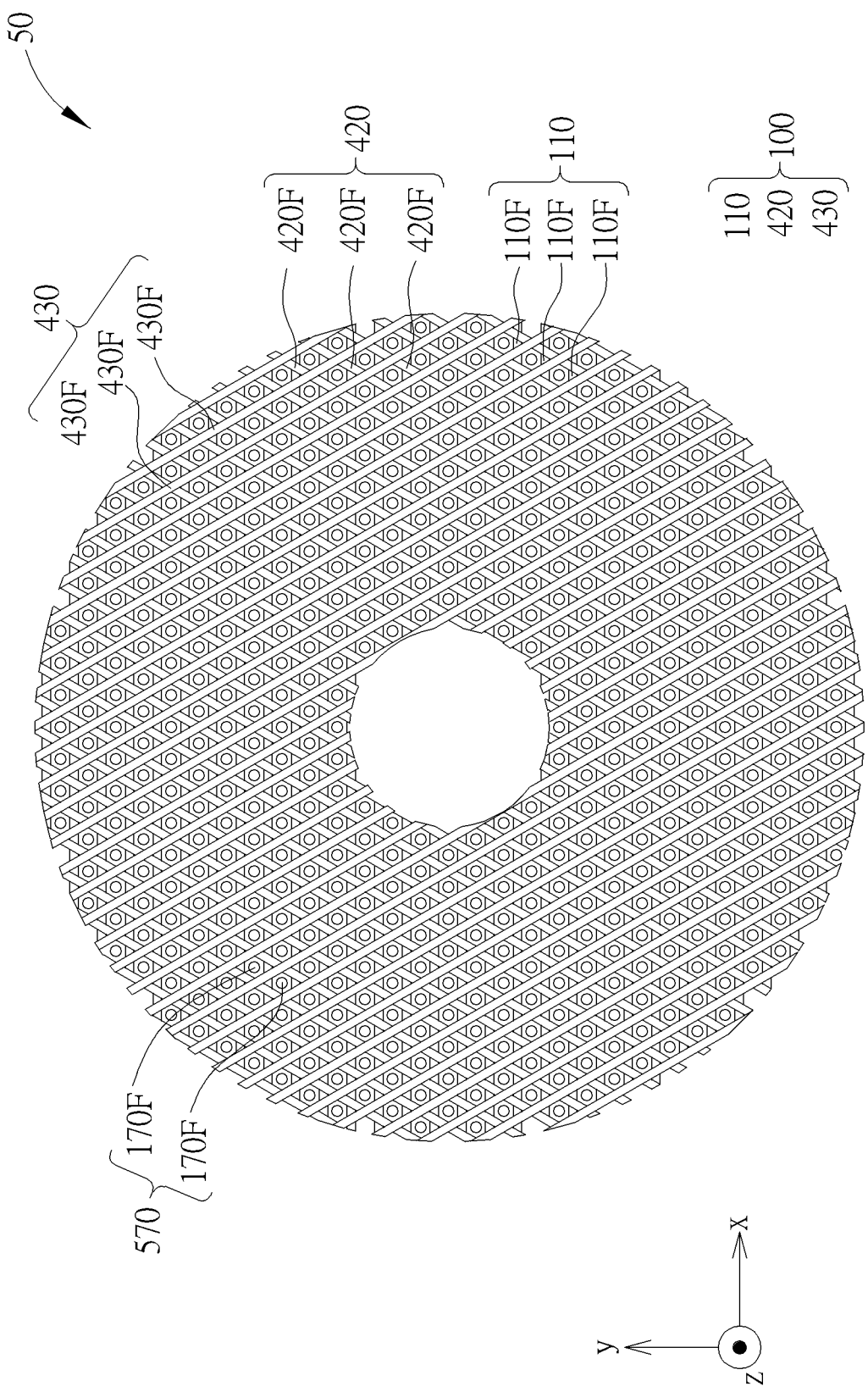
FIG. 5 is a cross-section view diagram of an end product according to an embodiment of the present invention.

The structure of the composite material may be further modified according to different design requirements. Please refer to FIG. 5. FIG. 5 is a cross-section view diagram of an end product 50 according to an embodiment of the present invention. The end product 50 is made from composite material like the composite material 10 in FIG. 1, and the structure of the end product 50 is quite similar to that of the end product 40. Therefore, the same numerals and notations denote the same components in the following description, and the similar parts are not detailed redundantly. Distinct from the end product 40 shown in FIG. 4, each of the fiber filaments 170F of the fiber array 570 has a shape of a cylinder. In other words, the shape of the fiber filaments 170F of the fiber array 570 is identical to that of the fiber filaments 170F of the fiber array 170 shown in FIG. 1 while the arrangements of the fiber filaments 170F differ.

Figure 6A:
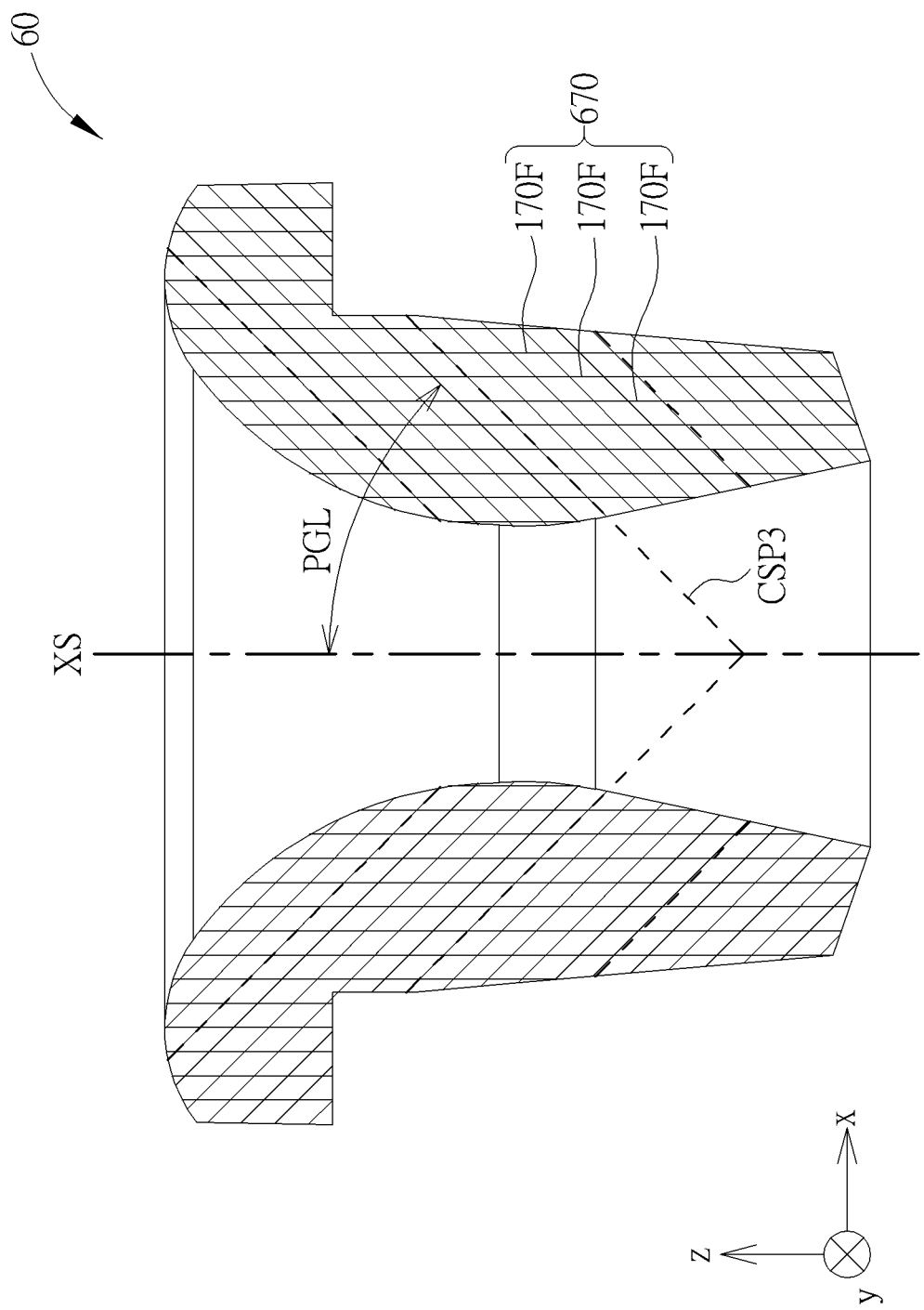
FIG. 6A is a cross-section view diagram of an end product according to an embodiment of the present invention.
Figure 6B:
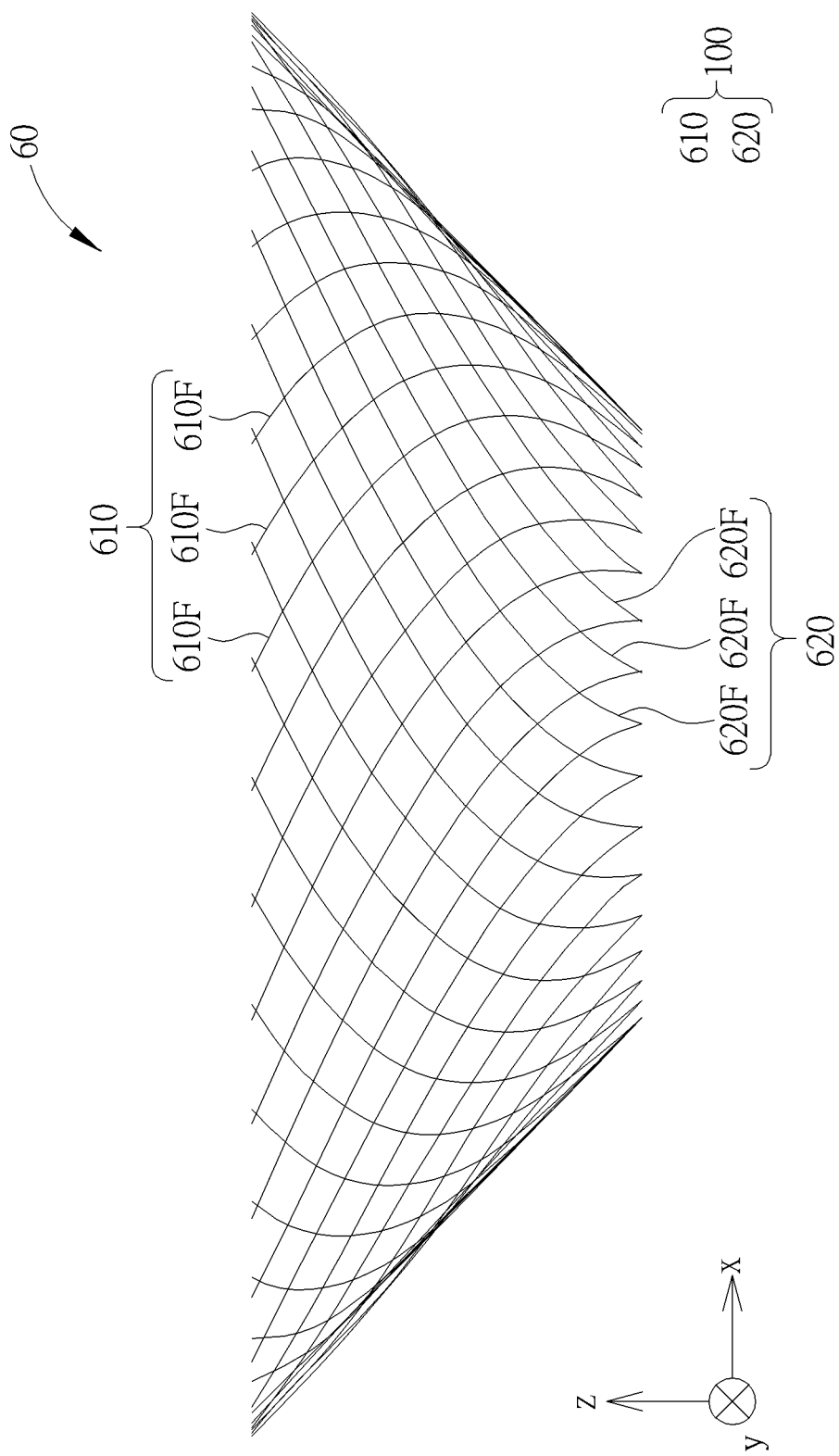
FIG. 6B is a side view diagram of one first fiber layer 610 and one second fiber layer 620 of the end product adjacent to a cross-sectional surface CSP3 in FIG. 6A.
Figure 6C:
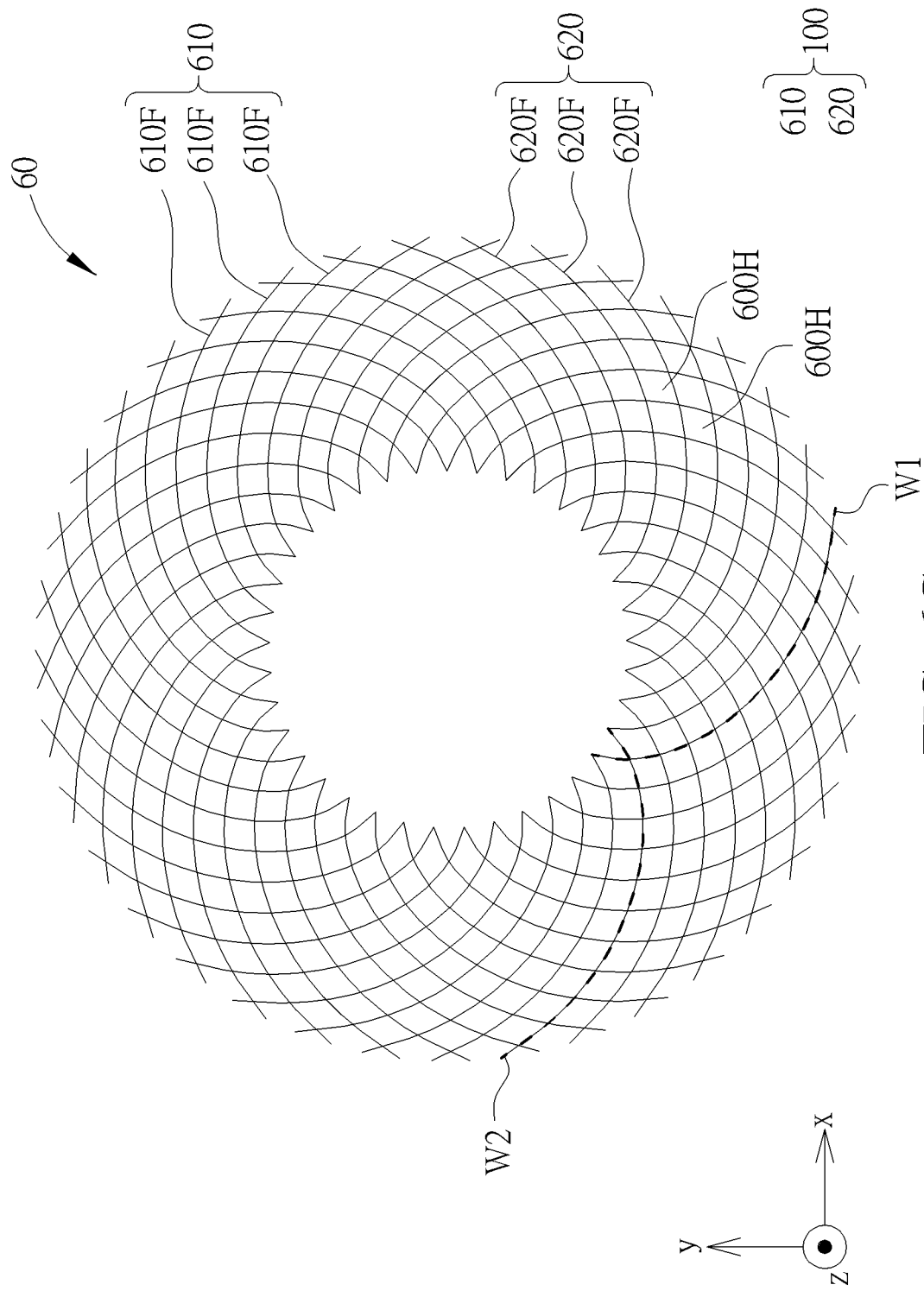
FIG. 6C is a top view diagram of one first fiber layer 610 and one second fiber layer 620 of the end product adjacent to the cross-sectional surface CSP3 in FIG. 6A.

The structure of the composite material may be further modified according to different design requirements. Please refer to FIG. 6A to FIG. 6C. FIG. 6A is a cross-section view diagram of an end product 60 according to an embodiment of the present invention. FIG. 6B is a side view diagram of one first fiber layer 610 and one second fiber layer 620 of the end product 60 adjacent to a cross-sectional surface CSP3 in FIG. 6A, wherein other components of the end product 60 are omitted for the sake of simplicity. FIG. 6C is a top view diagram of one first fiber layer 610 and one second fiber layer 620 of the end product 60 adjacent to the cross-sectional surface CSP3 in FIG. 6A, wherein other components of the end product 60 are omitted for the sake of simplicity. The end product 60 is made from composite material like the composite material 10 in FIG. 1, and the structure of the end product 60 is quite similar to that of the end product 30. Therefore, the same numerals and notations denote the same components in the following description, and the similar parts are not detailed redundantly.

Distinct from the composite material 10 shown in FIG. 1 or the end product 30 shown in FIG. 3, the fiber layers 100 shown in FIG. 6B may be categorized into first fiber layers 610 and second fiber layers 620. In Step 202, or the lamination process, the fiber layers 100 is built up by alternately stacking the first fiber layers 610 and the second fiber layers 620 on/above a tapered surface (such as the cross-sectional surface CSP3). In some embodiments, the cross-sectional surface CSP3 may be a curved or bent surface of a round taper, and each of the first fiber layers 610 (or each of the second fiber layers 620) is disposed on the curved or bent surface of a round taper. In some embodiments, the cross-sectional surface CSP3 may be conical surface, and each of the first fiber layers 610 (or each of the second fiber layers 620) is disposed on the conical surface. In other words, each of the first fiber layers 610 (or each of the second fiber layers 620) is shaped like a cone or a portion of a cone. As shown in FIG. 6A, there is a ply angle PGL between an axis XS and each of the first fiber layers 610 or the second fiber layers 620 (or the cross-sectional surface CSP3). The ply angle PGL may be 45 degrees. The axis XS may be the axis of symmetry of the cross-sectional surface CSP3. In some embodiments, the cross-sectional surface CSP3 may be a conical surface, and a (dummy) cone axis (i.e., the axis XS) is at the ply angle PGL with respect to a cross-section line from a (dummy) cone apex to a boundary point of the (dummy) conical surface.

Each of the first fiber layers 610 includes fiber filaments 610F, each of which extend along a first involute (sometimes also referred to as an evolvent) VV1 and lie on/above an (upper) tapered surface. Similarly, each of the second fiber layers 620 includes fiber filaments 620F, each of which extend along a second involute VV2 and lie on/above a (lower) tapered surface. The first involute VV1 may twist clockwise while the second involute VV2 may twist counterclockwise. The first involute VV1 and the second involute VV2 intersect to form a grid; that is to say, the first involute VV1 and the second involute VV2 pass or lie across each other.

Because two adjacent fiber filaments 610F are intersected with two adjacent fiber filaments 620F to form a mesh opening 600H, the mesh openings 600H are defined by the (adjacent) fiber filaments 610F, 620F. In the filling process, fiber filaments 170F, which extend in the direction Z and are arranged in an array, of a fiber array 670 of the end product 60 fill the mesh openings 600H together with the second binder to reinforce the fiber layers 100. In some embodiments, the shape of one fiber filament 170F may be a cylinder, a cuboid, a hexagonal prism or other uniform prisms. In some embodiments, each of the fiber filaments 170F may has a shape to be completely embedded in one mesh opening 600H formed by fiber filaments 110F and 120F.

In summary, fiber filaments can be laid up and laminated together to form the composite material with multi-dimensional reinforcements of the present invention. After the deliberate structure design, the fiber filaments are oriented in different directions to increase the strength (especially in a thickness direction) of the composite material with multi-dimensional reinforcements of the present invention. Furthermore, the ratio of the volume of the fiber filaments to the volume of the composite material with multi-dimensional reinforcements of the present invention is high. The composite material with multi-dimensional reinforcements of the present invention adopted 3D printing technology may be shaped directly or be reshaped after machined on the inside and outside to the desired contours. Therefore, the composite material with multi-dimensional reinforcements of the present invention provides design flexibility without resulting in huge material waste and additional machining cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A composite material fabrication method, comprising:
   stacking a plurality of fiber layers and a first binder and curing the first binder to form a three-dimensional structure with a plurality of mesh openings, wherein a plurality of first mesh openings of the plurality of mesh openings are connected in a first direction, the plurality of fiber layers comprise first fiber layers and second fiber layers, the first fiber layers comprise a plurality of first fiber filaments, the second fiber layers comprise a plurality of second fiber filaments, each of the plurality of first fiber filaments or the plurality of second fiber filaments is disposed on a taper surface, and a ply angle is between an axis and one of the first fiber layers and the second fiber layers; and
   filling the plurality of mesh openings with a plurality of fiber filaments of a fiber array and a second binder and curing the second binder.

2. The composite material fabrication method of claim 1, further comprising:
   performing a high temperature heat treatment to decompose the first binder and the second binder in a non-oxygen environment; and
   repeating a vapor deposition or a liquid deposition for densification.

3. The composite material fabrication method of claim 1, wherein the plurality of first fiber filaments extend along a first involute, wherein the plurality of second fiber filaments extend along a second involute, wherein the first involute and the second involute intersect, and wherein the plurality of mesh openings are defined by of the plurality of first fiber filaments and the plurality of the second fiber filaments.

4. The composite material fabrication method of claim 1, wherein each of the plurality of fiber layers is disposed in a plane.

5. The composite material fabrication method of claim 1, wherein the first binder is cured during a lamination process.

6. The composite material fabrication method of claim 1, wherein the first binder is cured after a lamination process.

7. The composite material fabrication method of claim 1, wherein the plurality of fiber filaments and the second binder to be inserted into the plurality of mesh openings are a plurality of composite material sticks cured in advance.

* * * * *